United States Patent
Park et al.

(10) Patent No.: US 9,736,744 B2
(45) Date of Patent: Aug. 15, 2017

(54) METHOD AND APPARATUS FOR TRANSMITTING INDICATION IN WIRELESS COMMUNICATION SYSTEM

(71) Applicant: LG Electronics Inc., Seoul (KR)

(72) Inventors: Kyungmin Park, Seoul (KR); Daewook Byun, Seoul (KR); Jian Xu, Seoul (KR)

(73) Assignee: LG Electronics Inc., Seoul (KR)

(*) Notice: Subject to any disclaimer, the term of this patent is extended or adjusted under 35 U.S.C. 154(b) by 5 days.

(21) Appl. No.: 14/411,142

(22) PCT Filed: Aug. 1, 2013

(86) PCT No.: PCT/KR2013/006968
§ 371 (c)(1),
(2) Date: Dec. 24, 2014

(87) PCT Pub. No.: WO2014/021671
PCT Pub. Date: Feb. 6, 2014

(65) Prior Publication Data
US 2015/0172982 A1   Jun. 18, 2015

Related U.S. Application Data

(60) Provisional application No. 61/679,079, filed on Aug. 3, 2012, provisional application No. 61/679,083, filed
(Continued)

(51) Int. Cl.
*H04W 4/00*   (2009.01)
*H04W 36/14*   (2009.01)
(Continued)

(52) U.S. Cl.
CPC ....... *H04W 36/14* (2013.01); *H04W 36/0066* (2013.01); *H04W 36/30* (2013.01); *H04W 36/38* (2013.01)

(58) Field of Classification Search
CPC .............................. H04W 36/12; H04W 36/00
See application file for complete search history.

(56) References Cited

U.S. PATENT DOCUMENTS

2011/0292821 A1   12/2011   Chin et al.
2012/0093129 A1   4/2012   Zhao et al.
(Continued)

FOREIGN PATENT DOCUMENTS

WO   2012/051903 A1   4/2012

OTHER PUBLICATIONS

International Search Report issued in corresponding International Patent Application No. PCT/KR2013/006968 dated Nov. 27, 2013.
(Continued)

*Primary Examiner* — Huy D Vu
*Assistant Examiner* — Teisha D Hall
(74) *Attorney, Agent, or Firm* — Morgan, Lewis & Bockius LLP

(57) ABSTRACT

A method and apparatus for transmitting an indication in a wireless communication system is provided. An eNodeB (eNB) of a first system transmits an indication, which indicates that handover of a user equipment (UE) from the eNB to a radio network controller (RNC) of a second system is a necessary handover, to the RNC. In addition, a method and apparatus for receiving an indication for inter-radio access technology (RAT) unnecessary handover in a wireless communication system is provided. An eNB of a first system transmits a request for measuring, by a UE, quality of signals from the first system, and information related to the inter-RAT unnecessary handover, and receives an indication for the inter-RAT unnecessary handover.

8 Claims, 15 Drawing Sheets

Related U.S. Application Data on Aug. 3, 2012, provisional application No. 61/683,137, filed on Aug. 14, 2012, provisional application No. 61/692,719, filed on Aug. 24, 2012.

(51) Int. Cl.
  *H04W 36/00*  (2009.01)
  *H04W 36/30*  (2009.01)
  *H04W 36/38*  (2009.01)

(56) References Cited

U.S. PATENT DOCUMENTS

| | | |
|---|---|---|
| 2013/0230022 A1 | 9/2013 | Guo et al. |
| 2014/0155065 A1* | 6/2014 | Centonza .......... H04W 36/0066 455/436 |
| 2015/0237557 A1* | 8/2015 | Alonso-Rubio ...... H04W 36/30 455/437 |

OTHER PUBLICATIONS

3GPP TS 23.401 V11.2.0, Jun. 2012, Technical Specification: 3rd Generation Partnership Project: Technical Specification Group Services and System Aspects: General Packet Radio Service (GPRS) enhancements for Evolved Universal Terrestrial Radio Access Network (E-UTRAN) access (Release 11).

\* cited by examiner (a)

(b)

METHOD AND APPARATUS FOR TRANSMITTING INDICATION IN WIRELESS COMMUNICATION SYSTEM

BACKGROUND OF THE INVENTION

Field of the Invention

The present invention relates to wireless communication, and more particularly, to a method and apparatus for transmitting an indication in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As shown in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As shown, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As shown, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer shown in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As shown in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As shown in FIG. 3(b), the RLC and MAC layers (terminated in an eNodeB 20 on the network side) perform the same functions for the control plane. As shown, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC_state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As shown in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The 3GPP LTE may support mobility robustness optimization. Mobility robustness optimization aims at detecting and enabling correction of connection failure due to intra-LTE mobility and/or unnecessary handover (HO) to another radio access technology (RAT), i.e. too early inter-RAT HO with no radio link failure.

Unnecessary HO to another RAT is described in detail. One of the purposes of inter-RAT mobility robustness optimization is the detection of a non-optimal use of network resources. In particular, in case of inter-RAT operations and when the E-UTRAN is considered, the case known as unnecessary HO to another RAT is identified. The problem is defined as a case the UE is handed over from the E-UTRAN to other RAT (e.g. GSM/EDGE radio access network (GERAN) or UTRAN) even though quality of the E-UTRAN coverage was sufficient for the service used by the UE. The handover may therefore be considered as unnecessary HO to another RAT (too early inter-RAT HO without connection failure).

In inter-RAT HO, if the serving cell threshold (E-UTRAN) is set too high, and another RAT with good signal strength is available, a handover to another RAT (e.g. UTRAN or GERAN) may be triggered unnecessarily, resulting in an inefficient use of the networks. With a lower threshold, the UE could have continued in the source RAT (E-UTRAN).

To be able to detect the unnecessary HO to another RAT, an eNB may choose to put additional coverage and quality condition information into a handover required message in a handover preparation procedure, when an inter-RAT HO from the E-UTRAN to another RAT occurs. The RAN node in the other RAT, upon receiving this additional coverage and quality information, may instruct the UE to continue measuring the source RAT (E-UTRAN) during a period of time, while being connected to another RAT (e.g. UTRAN or GERAN), and send periodic or single measurement reports to the other RAT (e.g. UTRAN or GERAN). When the period of time indicated by the source RAT (E-UTRAN) expires, the RAN node in the other RAT (e.g. UTRAN or GERAN), may evaluate the received measurement reports with the additional coverage and quality condition information received during the inter-RAT HO procedure and decide if an inter-RAT unnecessary HO report should be sent to the RAN node in the source RAT (E-UTRAN). The inter-RAT unnecessary HO report should include the following information:

Handover type (LTE to UTRAN, LTE to GERAN);
Type of detected handover problem (unnecessary HO to another RAT);
Evolved cell global identifier (ECGI) of the source cell in the handover;
Cell ID of the target cell;
A list of cells whose radio quality, as reported in the UE's first measurement report following the handover, exceeds the threshold indicated in the additional coverage and quality information in the handover preparation procedure.

The inter-RAT unnecessary HO report shall only be sent in cases where, in all UE measurement reports collected during the measurement period, any source RAT cells exceed the radio coverage and/or quality threshold (the radio threshold reference signal received power (RSRP) or/and reference signal received quality (RSRQ) and the measurement period are indicated in the additional coverage and quality information in the handover preparation procedure). No HO report shall be sent in case no E-UTRAN cell could be included, or if the indicated period of time is interrupted by a new outgoing inter-RAT handover, intra-UMTS handover with serving radio network controller (SRNC) relocation or inter-basic service set (BSS) handover.

The RAN node in the source RAT (E-UTRAN) upon receiving of the report, can decide if/how its parameters (e.g., threshold to trigger inter-RAT HO) should be adjusted.

Inter-RAT ping-pong is described in detail. One of the functions of mobility robustness optimization is to detect ping-pongs that occur in inter-RAT environment. Inter-RAT ping-pong problem may be defined as a case that a UE is handed over from a source cell in a source RAT (A) to a target cell in a target RAT (B) different from the source RAT, and handed over back to a cell in the source RAT (A) within a definable limited time. Also, if the UE stays at the target RAT still within the definable limited time, but passes through more than one cell before returning to the source RAT, this case may also be considered as the inter-RAT ping-pong.

Various methods for detecting the inter-RAT ping-pong have been proposed. However, additional requirement for stable operation of inter-RAT ping-pong detection may be proposed.

SUMMARY OF THE INVENTION

The present invention provides a method for transmitting an indication in a wireless communication system. The present invention provides additional requirement for stable operation of inter-ratio access technology (RAT) ping-pong detection. The present invention also provides a method for concrete application of unnecessary handover to another RAT procedure to the inter-RAT ping-pong detection.

In an aspect, a method for transmitting, by an eNodeB (eNB) of a first system, an indication in a wireless communication system is provided. The method includes performing handover of a user equipment (UE) from the eNB to a radio network controller (RNC) of a second system, receiving a handover report message from the RNC. The handover report message indicates that the handover of the UE is not unnecessary. The method includes transmitting an indication, which indicates that the handover of the UE from the eNB to the RNC is a necessary handover, to the RNC.

The first system may be a 3rd generation partnership project (3GPP) long term evolution (LTE) or an evolved UMTS terrestrial radio access network (E-UTRAN).

The second system may be a UMTS terrestrial radio access network (UTRAN).

The method may further include keeping handing over UEs from the eNB to the RNC.

In another aspect, a method for receiving, by an eNodeB (eNB) of a first system, an indication for inter-radio access technology (RAT) unnecessary handover in a wireless communication system is provided. The method include performing handover of a user equipment (UE) from the eNB to a radio network controller (RNC) of a second system, transmitting a request for measuring, by the UE, quality of signals from the first system, and information related to the inter-RAT unnecessary handover, and receiving an indication for the inter-RAT unnecessary handover.

The information related to the inter-RAT unnecessary handover may be a staying time threshold of the UE at the second system.

The indication for the inter-RAT unnecessary handover may indicate inter-RAT ping-pong if staying time, measured by the RNC, of the UE at the second system is smaller than the staying time threshold of the UE at the second system.

The information related to the inter-RAT unnecessary handover may be a request for measuring, by the RNC, staying time of the UE at the second system.

The indication for the inter-RAT unnecessary handover may include the staying time of the UE at the second system.

The information related to the inter-RAT unnecessary handover may be an indication which indicates one of unnecessary handover detection or inter-RAT ping-pong detection.

The information related to the inter-RAT unnecessary handover may be an identity of a destination cell of the first system.

The indication for the inter-RAT unnecessary handover may be received if the identity of the destination cell of the first system is the same as an identity of a cell to which the UE is handed over.

In another aspect, a method for receiving, by an eNodeB (eNB) of a first system, an indication for inter-radio access technology (RAT) unnecessary handover in a wireless communication system is provided. The method include performing handover of a user equipment (UE) from the eNB to a radio network controller (RNC) of a second system, transmitting a request for measuring, by the UE, quality of signals from the first system, and receiving an indication for the inter-RAT unnecessary handover with an identity of a cell of the first system to which the UE is finally handed over.

Inter-RAT ping-pong detection can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Detection of inter-radio access technology (RAT) ping-pong is described below.

Figure 1:
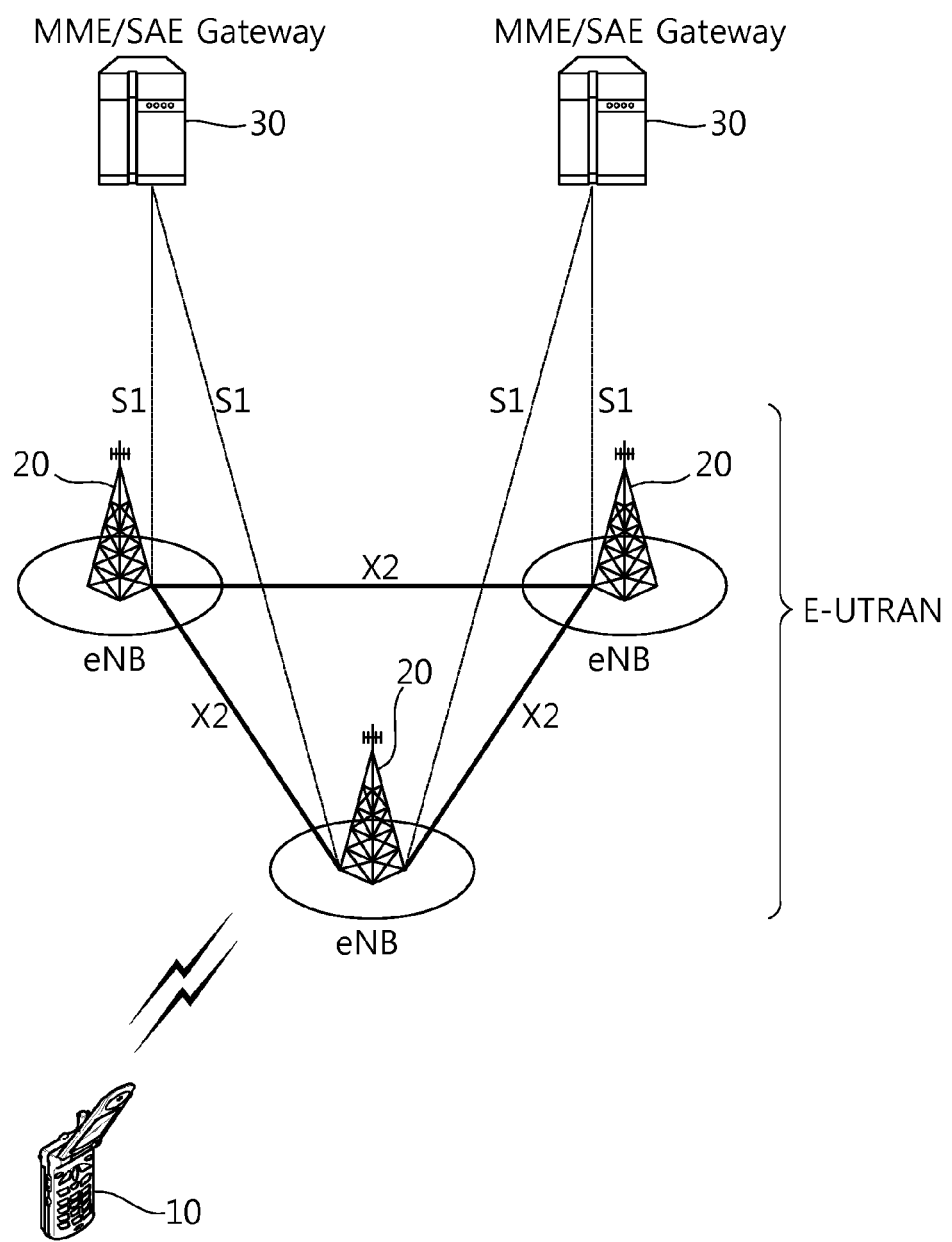
FIG. 1 shows network structure of an evolved universal mobile telecommunication system (E-UMTS).
Figure 2:
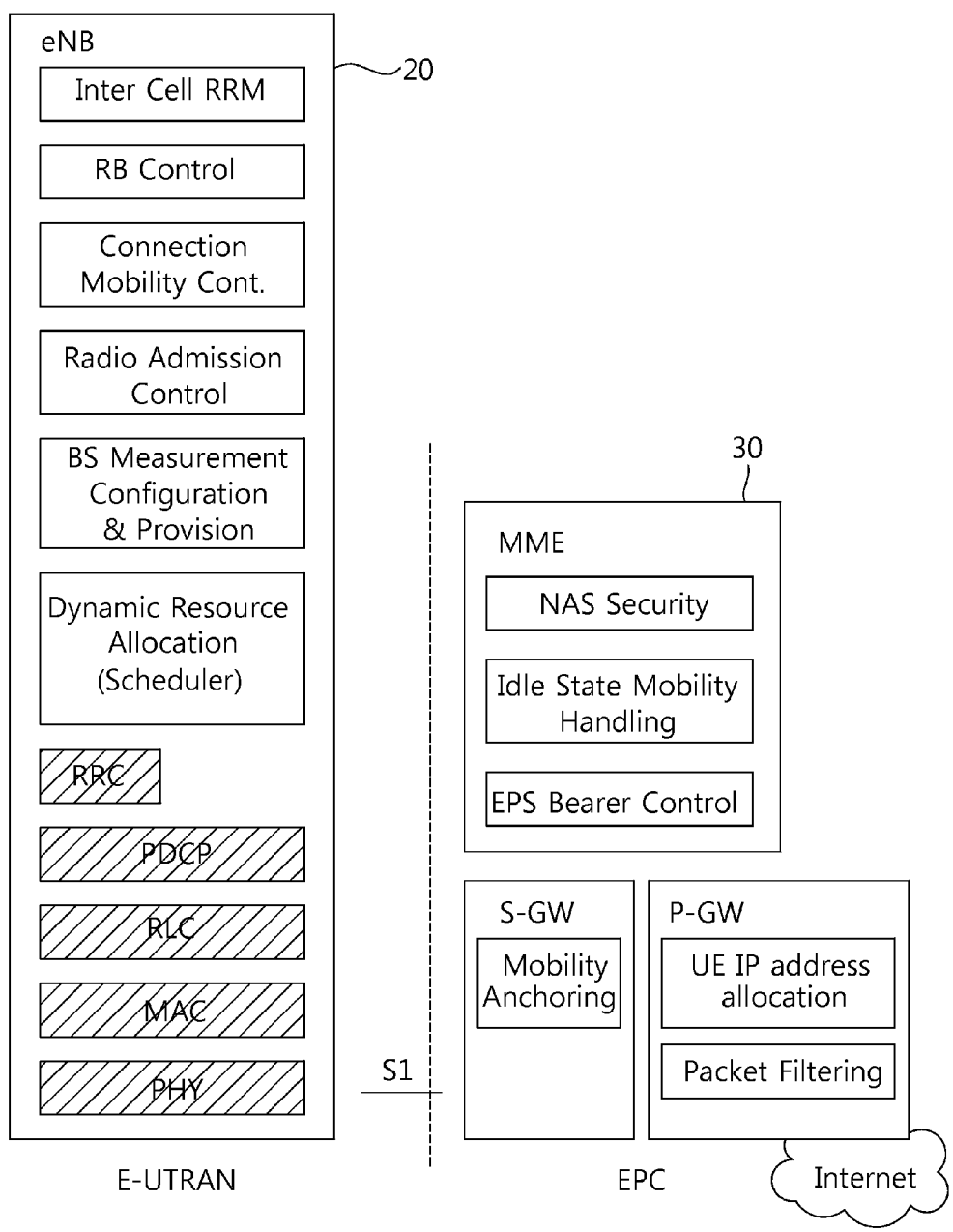
FIG. 2 shows architecture of a typical E-UTRAN and a typical EPC.
Figure 3:
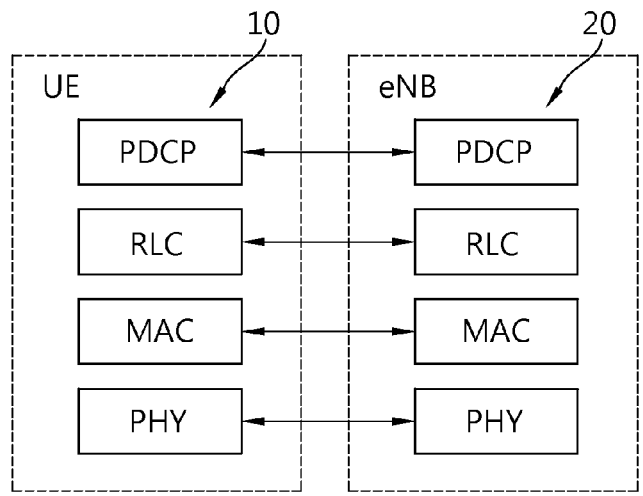
FIG. 3 shows a user-plane protocol and a control-plane protocol stack for the E-UMTS.
Figure 3:
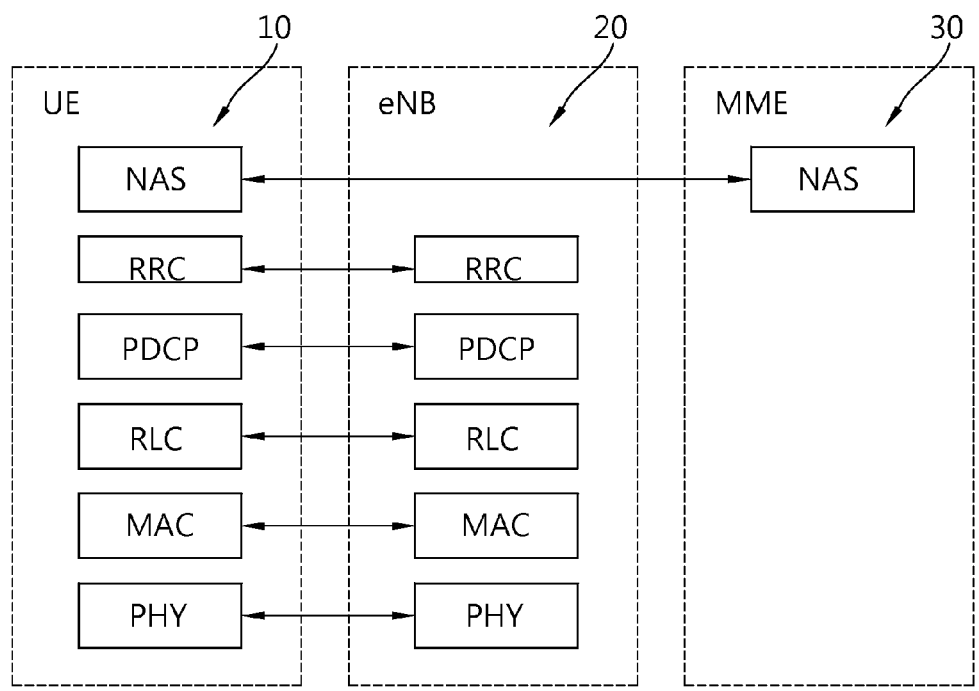
Figure 4:
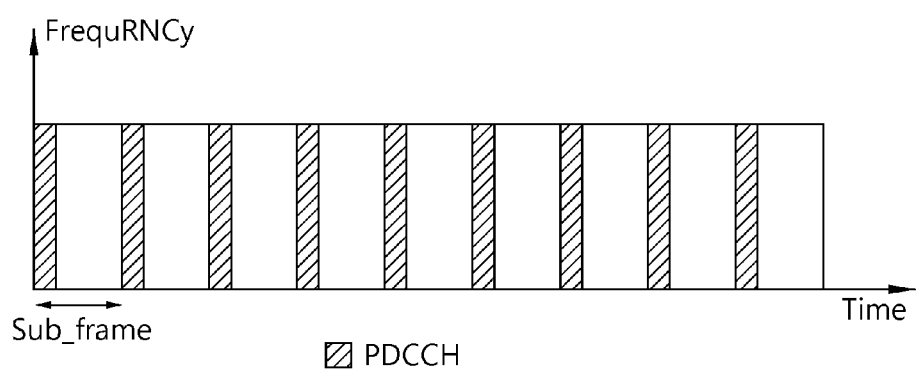
FIG. 4 shows an example of structure of a physical channel.
Figure 5:
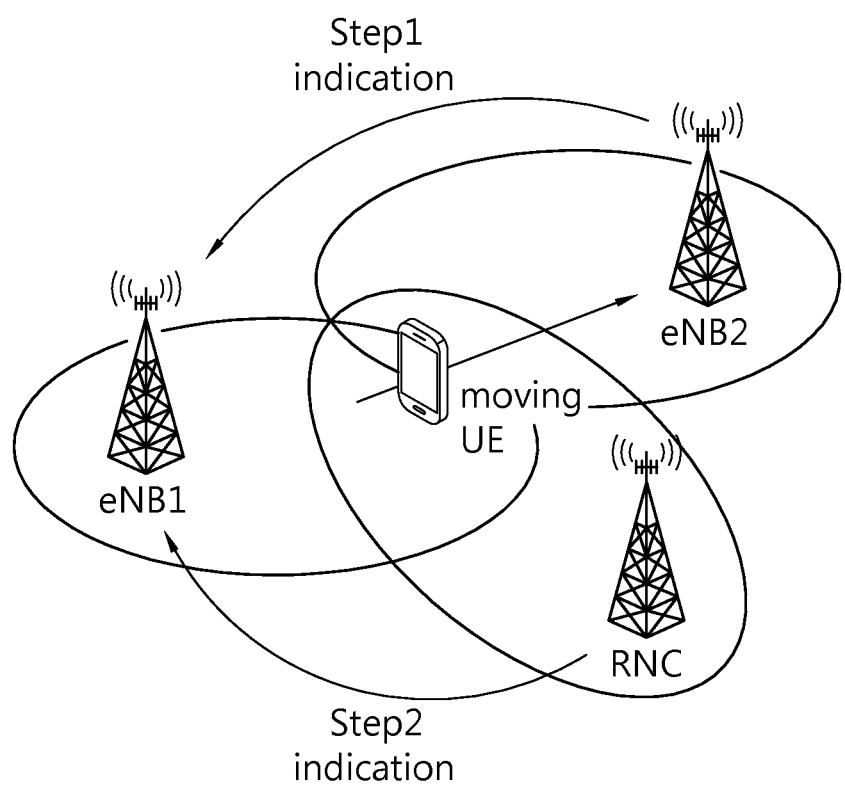
FIG. 5 shows a basic concept of inter-RAT ping-pong detection.

FIG. 5 shows a basic concept of inter-RAT ping-pong detection.

Referring to FIG. 5, eNB1 serves an E-UTRAN (i.e. 3GPP LTE) cell 1, and eNB2 serves an E-UTRAN cell 2. Also, a radio network controller (RNC) serves an UTRAN (i.e. WCDMA or 3G) cell around the E-UTRAN cell 1 and 2.

A user equipment (UE) moves from the E-UTRAN cell 1 to the E-UTRAN cell 2. A path of the UE is always in coverage of the E-UTRAN cell 1 and/or the E-UTRAN cell 2. However, the UE may be handed over from the E-UTRAN cell 1 to the UTRAN cell, and handed over to the E-UTRAN cell 2 again within a definable limited time. This may happen when threshold of the E-UTRAN cell is set too high, and signal strength of the UTRAN cell is good. Even though the UE is always in the coverage of the E-UTRAN cell 1 and/or the E-UTRAN cell 2, the UE may be handed over to the UTRAN cell by very short time.

To detect inter-RAT ping-pong, two step solutions may be proposed.

1) Step 1 is based on enhanced UE history information including a HO cause value and possible ping-pong indication on X2 interface. Statistics regarding inter-RAT ping-pong occurrences are collected by the responsible node, and the statistics regarding the inter-RAT ping-pong occurrence may be based on evaluation of UE history information IE in a handover required message.

That is, in case of inter-system handover from the E-UTRAN to the UTRAN, the source eNB shall, if supported, include HO cause value IE in the UE history information IE of the handover required message. For example, in FIG. 5, an eNB1 transmits the handover required message including the UE history information including the HO cause value to the RNC.

Table 1 shows UE history information. The UE history information contains information about cells that a UE has been served by in active state prior to the target cell.

TABLE 1

| IE/Group Name | Presence | Range | IE type and reference | Semantics description | Criticality | Assigned Criticality |
|---|---|---|---|---|---|---|
| Last Visited Cell List | | 1 to <MaxNr OfCells> | | Most recent information is added to the top of this list | — | — |
| >Last Visited Cell Information | M | | | | — | — |

Table 2 shows last visited cell information. The last visited cell information may contain E-UTRAN or UTRAN cell specific information.

TABLE 2

| IE/Group Name | Presence | Range | IE type and reference | Semantics description | Criticality | Assigned Criticality |
|---|---|---|---|---|---|---|
| CHOICE Last Visited Cell Information | M | | | | — | — |
| >E-UTRAN Cell | | | | | | |
| >>Last Visited E-UTRAN Cell Information | M | | | | — | — |
| >UTRAN Cell | | | | | | |
| >>Last Visited UTRAN Cell Information | M | | OCTET STRING | | — | — |
| >GERAN Cell | | | | | | |
| >>Last Visited GERAN Cell Information | M | | | | — | — |

Table 3 shows last visited E-UTRAN cell information. The last visited E-UTRAN cell information contains information about a cell that is to be used for RRM purposes.

TABLE 3

| IE/Group Name | Presence | Range | IE type and reference | Semantics description | Criticality | Assigned Criticality |
|---|---|---|---|---|---|---|
| Global Cell ID | M | | E-UTRAN CGI 9.2.1.38 | | — | |
| Cell Type | M | | 9.2.1.66 | | — | |
| Time UE stayed in Cell | M | | INTEGER (0 . . . 4095) | The duration of the time the UE stayed in the cell in seconds. If the UE stays in a cell more than 4095 s, this IE is set to 4095. | — | |
| Time UE stayed in Cell Enhanced Granularity | O | | INTEGER (0 . . . 40950) | The duration of the time the UE stayed in the cell in 1/10 seconds. If the UE stays in a cell more than 4095 s, this IE is set to 40950. | YES | ignore |
| HO Cause Value | O | | 9.2.1.3 | The cause for the handover from the E-UTRAN cell. | YES | ignore |

Referring to Table 1 to Table 3, the HO cause value is additionally included in the UE history information.

If the evaluation indicates a potential inter-RAT ping-pong and the source eNB of the 1st inter-RAT handover is different than the target eNB of the 2nd inter-RAT handover, the target eNB may use a HO report message to indicate the occurrence of potential inter-RAT ping-pong to the source eNB. For example, in FIG. 5, an eNB2, which is a target eNB of handover from the UTRAN to the E-UTRAN, may detect the inter-RAT ping-pong based on the UE history information, and may transmit an indication to the eNB1.

Accordingly, detection of possible inter-RAT ping-pong may be improved.

Table 4 shows a HO report message. The HO report message contains information for too early inter-RAT HO without connection failure.

TABLE 4

| IE/Group Name | Presence | Range | IE type and reference | Semantics description |
|---|---|---|---|---|
| HO Type | M | | ENUMERATED (LTE to UTRAN, LTE to GERAN, . . .) | |
| HO Report Type | M | | ENUMERATED (Unnecessary HO to another RAT, . . . , Early IRAT Handover) | The "Early IRAT Handover" code-point shall be used by the RNC according to TS 25.413 [19]. |
| HO Source ID | M | | IRAT Cell ID B.1.8 | Contains the cell ID of the source cell for the HO. This IE shall contain an E-UTRAN CGI, and shall be set to the same value as the Reporting Cell Identifier IE in TS 48.018 [18] |
| HO Target ID | M | | IRAT Cell ID B.1.8 | Contains the cell ID of the target cell for the HO. This IE shall contain either a UTRAN Cell ID or a GERAN Cell ID. |
| Candidate Cell List | | 1 to <maxNrOf CandidateCells> | | |
| >Candidate Cell ID | M | | IRAT Cell ID B.1.8 | This IE shall contain an E-UTRAN CGI. |

Referring to Table 4, a HO report type field in the HO report message includes 'Early IRAT Handover'. That is, the eNB2 may indicate the eNB1 that the inter-RAT ping-pong may occur by using the HO report type included in the HO report message.

2) Step 2 is based on the unnecessary HO to another RAT procedure. For detecting the inter-RAT ping-pong coverage verification may be performed to check if the mobility to other RAT was inevitable. If E-UTRAN coverage during the inter-RAT ping-pong needs to be verified for the purpose of determining corrective measures, the unnecessary HO to another RAT procedure may be used.

That is, like the unnecessary HO to another RAT procedure, the eNB1 request the RNC that a UE measures LTE signals and the RNC reports measurement reports to the eNB1. If an inter-RAT handover towards LTE is executed from the RNC within the indicated measurement period, the measurement period expires. In this case, the RNC may also send the HO report. No HO report shall be sent in case no E-UTRAN cell could be included, or if the indicated period of time is interrupted by an inter-RAT handover to a RAT different than LTE or by an intra-UMTS handover with SRNC relocation or inter-BSS handover. As described in Table 4, 'Early IRAT Handover' code-point may be used for the HO report of the RNC.

According to the two step solutions shown in FIG. 5, the inter-RAT ping-pong may be detected. However, additional requirement may be required for stable operation of detection of the inter-RAT ping-pong, and/or for the concrete applications of the unnecessary HO to another RAT procedure to the detection of the inter-RAT ping-pong. Hereinafter, various methods for improving detection of the inter-RAT ping-pong are described.

Figure 6:
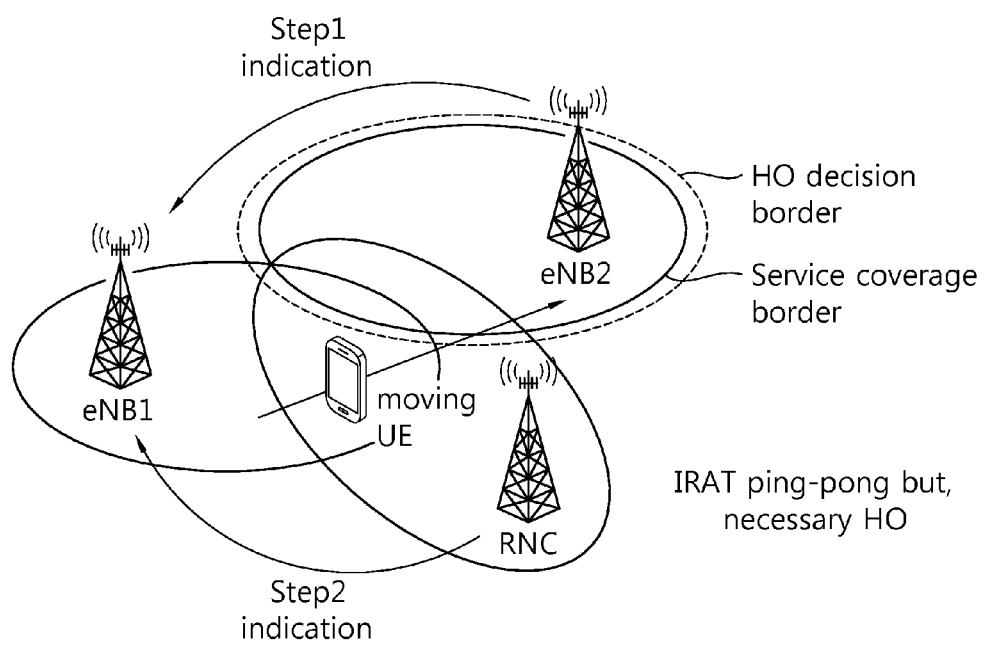
FIG. 6 shows an example of an inter-RAT ping-pong handover scenario which is not an unnecessary handover.

FIG. 6 shows an example of an inter-RAT ping-pong handover scenario which is not an unnecessary handover.

Referring to FIG. 6, LTE cells do not perfectly cover the area of 3G cell coverage. That is, a moving path of the UE is not always present within the coverage of the E-LTE cell 1 and/or the LTE cell 2. Even though inter-RAT ping-pong occurs, this is not unnecessary handover. After step 1/2 procedure shown in FIG. 5, the eNB1 concludes that UEs moving toward 3G cell cannot avoid handover to 3G cell. Based on this conclusion, the eNB1 always hands over UEs to the 3G cell first, even though the eNB2 detects inter-RAT ping-pong events by step 1 procedure. However, if the eNB1 does not indicate the necessity of handover to the eNB2 after the conclusion about keeping handover to the 3G cell first in this scenario, then the eNB2 may also keep transmitting the inter-RAT ping-pong indications to the eNB1 for UEs coming later wastefully.

Therefore, if the eNB1 concludes that UEs should be handed over to the 3G cell first, then the eNB1 needs to indicate the necessity of handover to the eNB2. Accordingly, a method for transmitting an indication which notifies that the handover from the eNB1 to the RNC is a necessary handover, when the eNB and the RNCs performs handover after concluding that the handover to the 3G cell is not the unnecessary handover, may be proposed.

Figure 7:
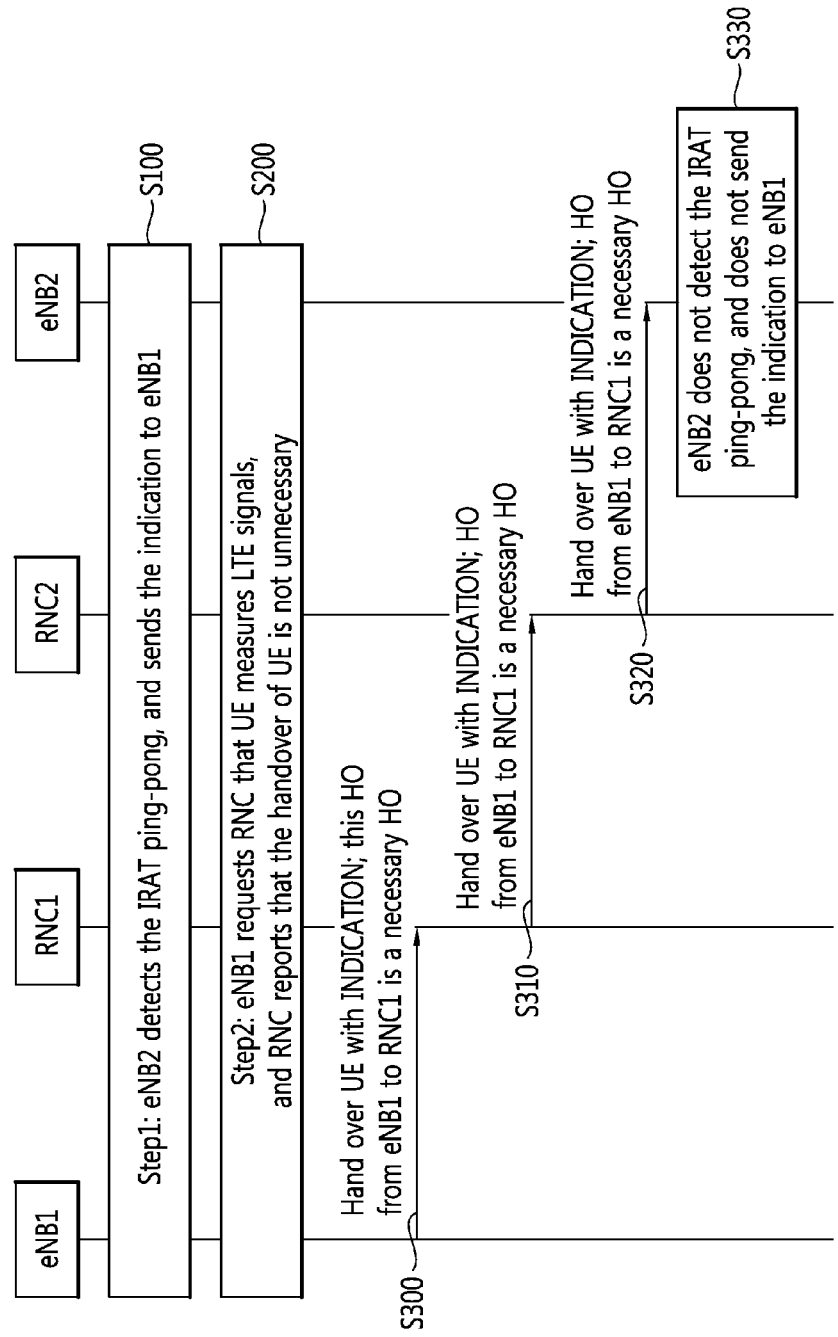
FIG. 7 shows an example of a method for transmitting an indication according to an embodiment of the present invention.

FIG. 7 shows an example of a method for transmitting an indication according to an embodiment of the present invention.

At step S100, an eNB2 detects an inter-RAT ping-pong, and transmits an indication of the inter-RAT ping-pong to an eNB1. This step corresponds to the step 1 procedure shown in FIG. 5.

At step S200, the eNB1 request an RNC that UEs measure LTE signals, and the RNC reports that handover of UEs is not unnecessary. This step corresponds to the step 2 procedure shown in FIG. 5.

Based on the measurement reports received by the RNC, the eNB1 may know that the handover to an RNC1 is not unnecessary. Accordingly, the eNB1 keeps handing over UEs to the RNC1 first, and does not handover UEs to the eNB2 directly. In this case, at step S300, the eNB1 hands over UEs to the RNC1 with indication which indicates that this handover from the eNB1 to the RNC1 is a necessary handover. At step S310, the RNC1 hands over UEs to an RNC2 with indication which indicates that this handover from the eNB1 to the RNC1 is a necessary handover. At step S320, the RNC2 hands over UEs to the eNB2 with indication which indicates that this handover from the eNB1 to the RNC1 is a necessary handover.

Upon receiving the indication, the eNB2 may know that detected inter-RAT ping-pong is not the unnecessary handover. Accordingly, at step S330, the eNB2 does not detect inter-RAT ping-pong, and does not transmit the indication of the inter-RAT ping-pong to the eNB1.

According to an embodiment shown in FIG. 7, unnecessary signaling of inter-RAT ping-pong indication may be avoided.

The inter-RAT ping-pong requires 1) unnecessary HO to another RAT, and 2) short staying time at another RAT. Therefore, if the inter-RAT ping-pong occurs, the unnecessary HO to another RAT also occurs. It means that, by avoiding the unnecessary HOs to another RAT, it is possible to avoid the inter-RAT ping-pong.

Based on this comprehension, the reason why the inter-RAT ping-pong is distinguished from the unnecessary HO to another RAT is to apply different handover policy to the inter-RAT ping-pong. For example, it is possible that in case that the UE will stay at another RAT (3G network) shortly, even though the signal strength of the LTE in 3G cell coverage is low, the eNB does not hand over the UE to the 3G network. This case corresponds to the inter-RAT ping-pong. On the other hand, it is possible that in case that UE will stay at another RAT (3G network) lengthy, only when the signal strength of the LTE in the 3G cell coverage is high, the eNB does not hand over the UE to the 3G network. This case corresponds to the unnecessary HO to another RAT.

Accordingly, a method for distinguish short stay UEs at 3G network (inter-RAT ping-pong UEs) in the step 2 procedure may be proposed.

Figure 8:
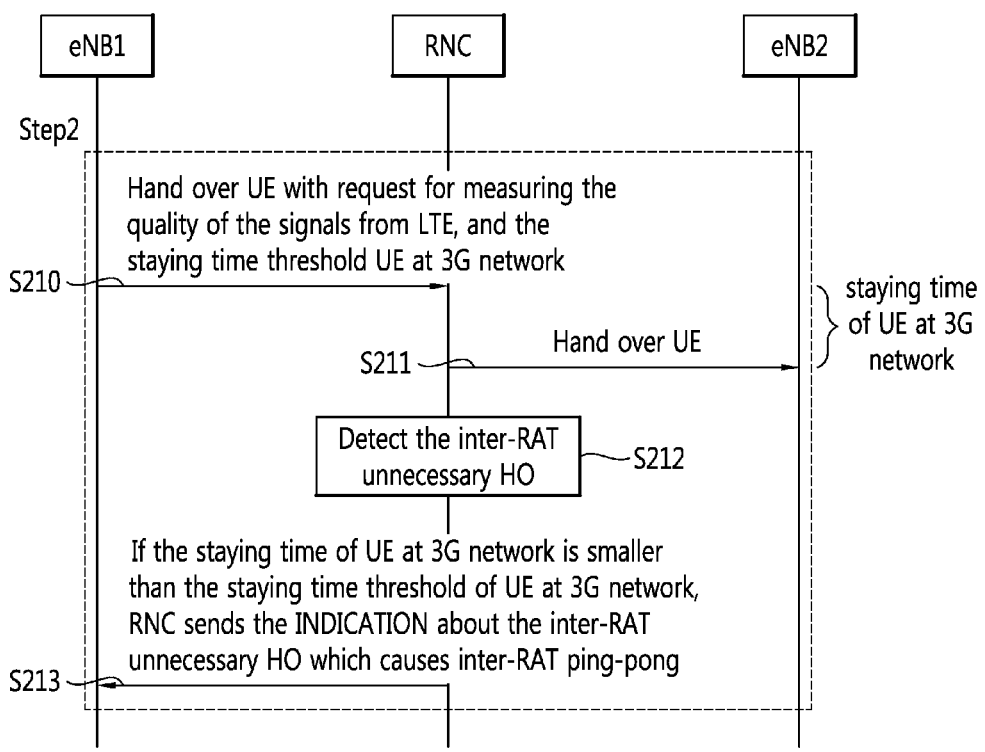
FIG. 8 shows an example of receiving an indication according to an embodiment of the present invention.

FIG. 8 shows an example of receiving an indication according to an embodiment of the present invention.

At step S210, the eNB1 hands over the UE to the RNC with request for measuring quality of signals from LTE, and staying time threshold of the UE at 3G network.

At step S211, the RNC hands over the UE to the eNB2. At step S212, the RNC detects the inter-RAT unnecessary HO. In this case, staying time of the UE at the 3G network is measured.

At step S213, if the measure staying time of the UE at the 3G network is smaller than the staying time threshold of the UE at the 3G network, the RNC transmits an indication about the inter-RAT unnecessary HO which cause the inter-RAT ping-pong.

Figure 9:
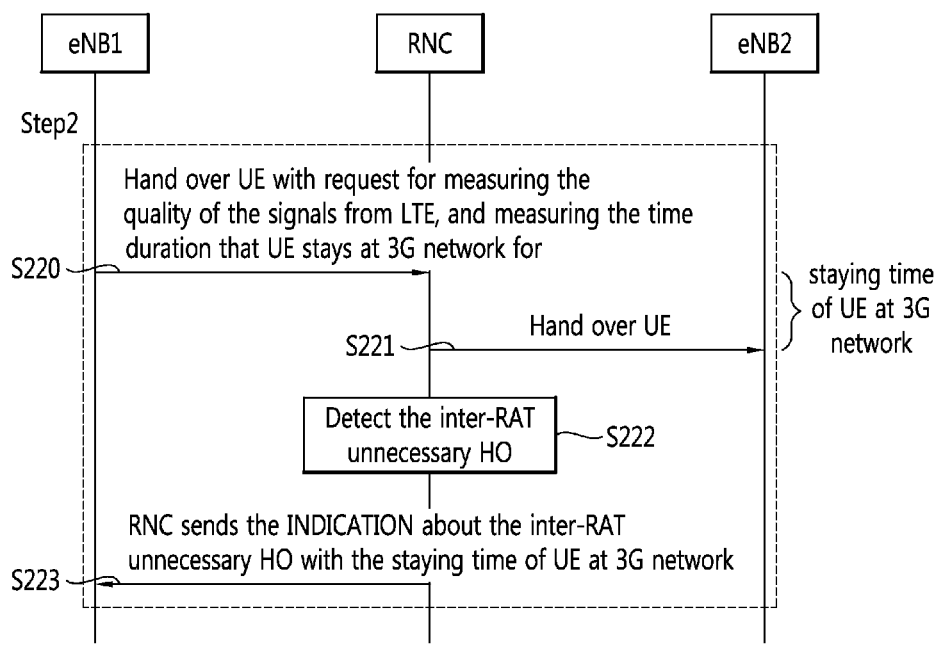
FIG. 9 shows another example of receiving an indication according to an embodiment of the present invention.

FIG. 9 shows another example of receiving an indication according to an embodiment of the present invention.

At step S220, the eNB1 hands over the UE to the RNC with request for measuring quality of signals from LTE, and measuring staying time of the UE at the 3G network.

At step S221, the RNC hands over the UE to the eNB2. At step S222, the RNC detects the inter-RAT unnecessary HO. In this case, staying time of the UE at the 3G network is measured.

At step S223, the RNC transmits an indication about the inter-RAT unnecessary HO with the staying time of the UE at the 3G network.

According to embodiments shown in FIG. 8 and FIG. 9, the eNB1 can may distinguish inter-RAT ping-pong UEs from unnecessary HO to another RAT UEs.

In the current discussion about step 2 procedure shown in FIG. 5, the source eNB cannot recognize the cell of LTE which the UE (which requested to measure LTE signals while it stays at 3G network) is finally handed over to.

Figure 10:
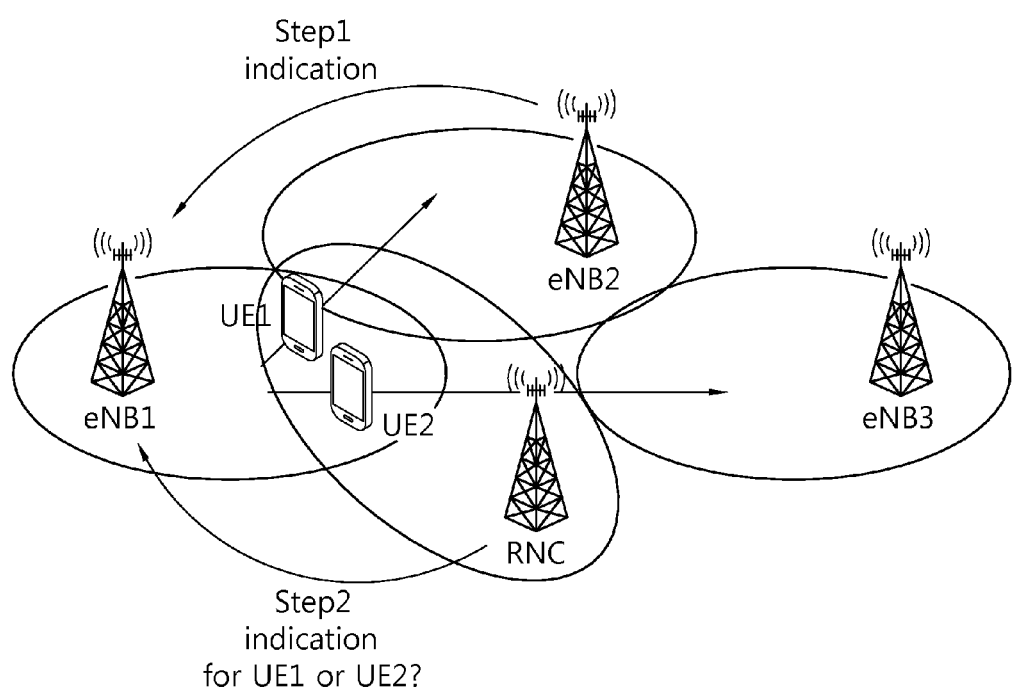
FIG. 10 shows an example of inter-RAT handover.

FIG. 10 shows an example of inter-RAT handover.

Referring to FIG. 10, a UE1 moves from the eNB1 to the eNB2 via the 3G network. A UE2 moves from the eNB1 to the eNB3 via the 3G network. However, even though the RNC transmits the HO report to the eNB for the inter-RAT ping-pong based on the step 2 shown in FIG. 5, the eNB1 does not know whether the UE is handed over (from the RNC) to the eNB2 or the eNB3. This disturbs the eNB1 to analyze inter-RAT ping-pong correctly. In other words, the eNB1 needs to distinguish the inter-RAT ping-pong to the eNB2 from the inter-RAT ping-pong to the eNB2, and analyze and fix them separately.

Accordingly, a method for recognizing a cell identification of LTE which the UE (which requested to measure LTE signals while it stays at 3G network) is finally handed over to may be proposed.

Figure 11:
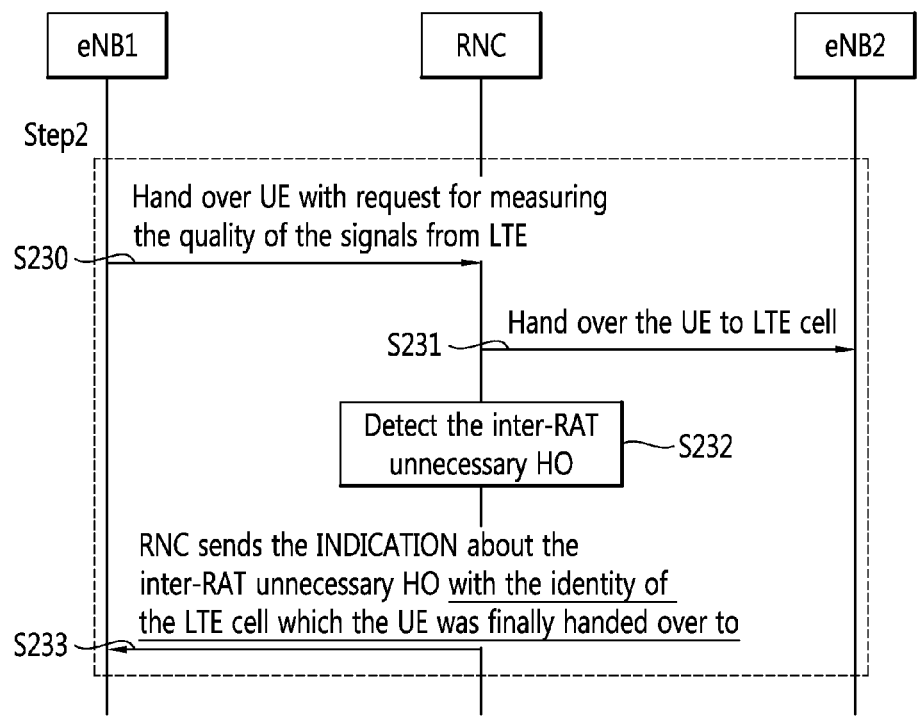
FIG. 11 shows another example of receiving an indication according to an embodiment of the present invention.

FIG. 11 shows another example of receiving an indication according to an embodiment of the present invention.

At step S230, the eNB1 hands over the UE to the RNC with request for measuring quality of signals from LTE. At step S231, the RNC hands over the UE to the eNB2. At step S232, the RNC detects the inter-RAT unnecessary HO.

At step S233, the RNC transmits an indication about the inter-RAT unnecessary HO with an identity of an LTE cell which the UE was finally handed over to.

Figure 12:
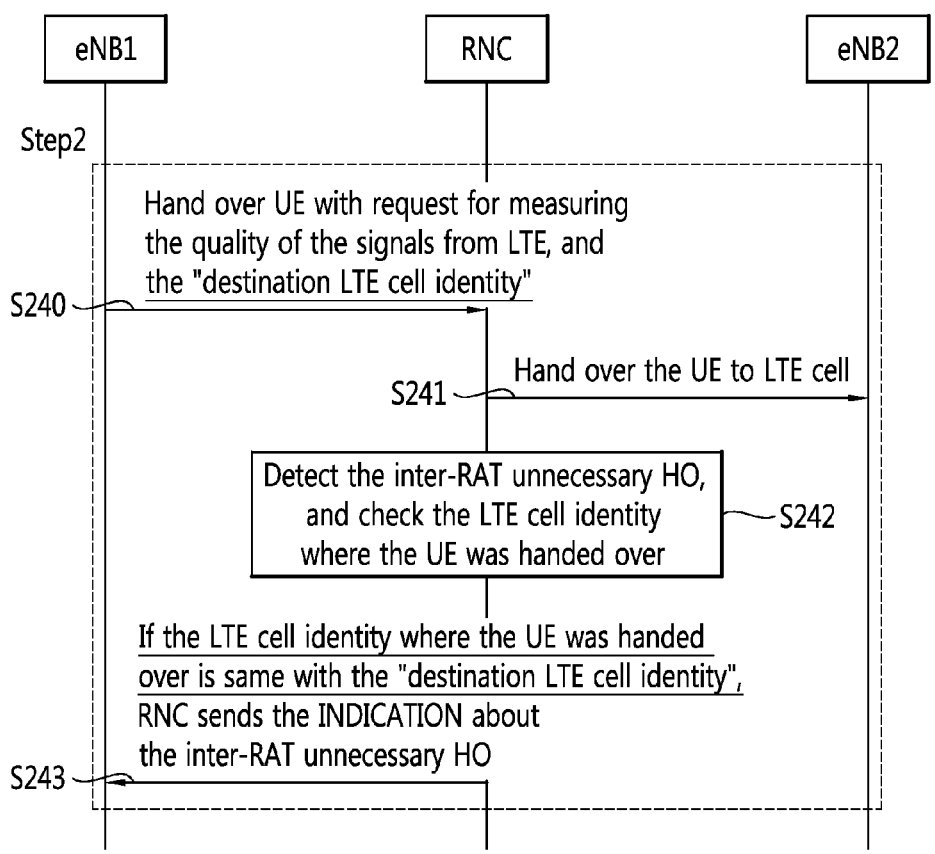
FIG. 12 shows another example of receiving an indication according to an embodiment of the present invention.

FIG. 12 shows another example of receiving an indication according to an embodiment of the present invention.

At step S240, the eNB1 hands over the UE to the RNC with request for measuring quality of signals from LTE, and an identity of a destination LTE cell. At step S241, the RNC hands over the UE to the eNB2. At step S242, the RNC detects the inter-RAT unnecessary HO, and checks an identity of an LTE cell which the UE was handed over.

At step S243, if the identity of the LTE cell where the UE was handed over is the same as the identity of the destination LTE cell, the RNC transmits an indication about the inter-RAT unnecessary HO.

According to embodiments shown in FIG. 10 and FIG. 11, the eNB1 can know the identity of the LTE cell which the UE is finally handed over to.

Meanwhile, current step 2 procedure shown in FIG. 5 has following problems:

1) When the eNB1 requests the RNC that the UE measures LTE signals during it stays in 3G network, the RNC cannot recognize whether this request is for 'unnecessary HO detection' or 'inter-RAT ping-pong detection'.

2) If the RNC cannot recognize whether the request of the eNB1 is for 'unnecessary HO detection' or 'inter-RAT ping-pong' detection, the indicated measurement period may be used for two options. That is, if it is assumed that the signal strength from LTE when the UE stays at 3G network is strong enough, the indicated measurement period may indicate either a period of time to measure LTE signals for 'unnecessary HO detection', or a time threshold for 'inter-RAT ping-pong detection'. If the indicated measurement period indicates the time threshold for 'inter-RAT ping-pong detection', if staying time of the UE at 3G network is smaller than the time threshold, then it is considered as the inter-RAT ping-pong. Otherwise, it is not considered as the inter-RAT ping-pong. The period of time to measure LTE signals for 'unnecessary HO detection' and the time threshold for 'inter-RAT ping-pong detection' are different each other, and usually the former is much shorter than the latter.

3) When the RNC reports the detected information to the eNB1, the source eNB cannot recognize whether this report is for 'unnecessary HO detection' or 'inter-RAT ping-pong detection'. For example, in case that the RNC includes 'Early IRAT Handover' field in the HO report, if the purpose of measurement request from the eNB1 was 'unnecessary HO detection', then the indicated measurement period might be set long, therefore the report about 'inter-RAT ping-pong' detection is not correct information to the eNB1.

Figure 13:
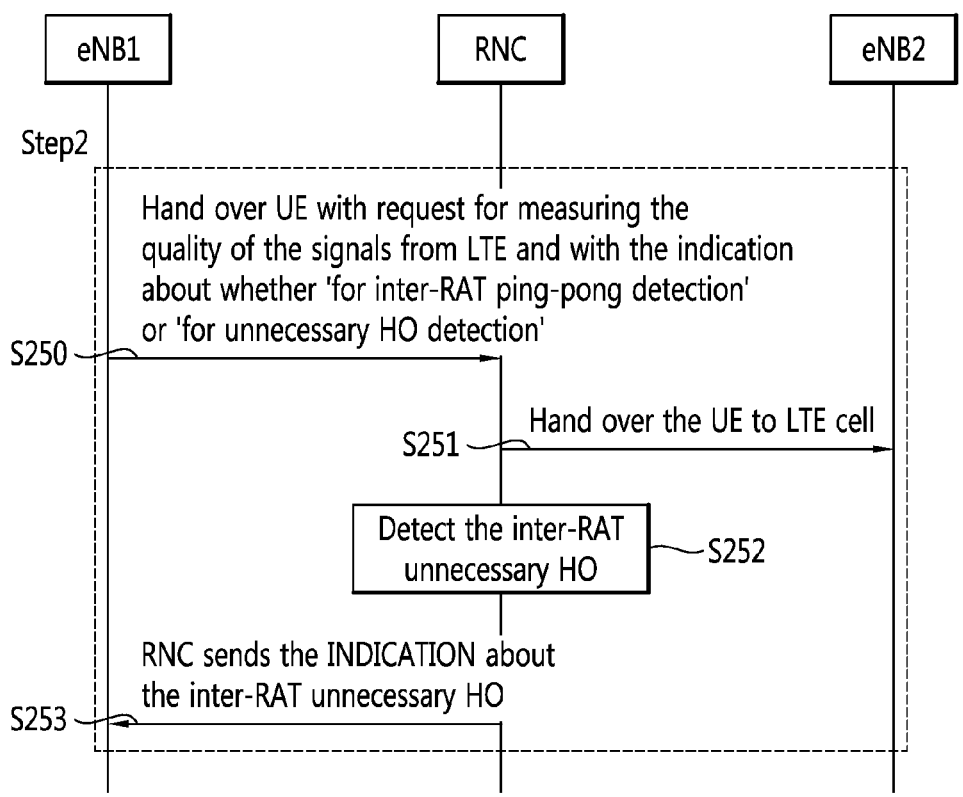
FIG. 13 shows another example of receiving an indication according to an embodiment of the present invention.

FIG. 13 shows another example of receiving an indication according to an embodiment of the present invention.

At step S250, the eNB1 hands over the UE to the RNC with request for measuring quality of signals from LTE, and with an indication about whether the request is for inter-RAT ping-pong detection or unnecessary HO detection.

At step S251, the RNC hands over the UE to the eNB2. At step S252, the RNC detects the inter-RAT unnecessary HO. At step S253, the RNC transmits an indication about the inter-RAT unnecessary HO.

Figure 14:
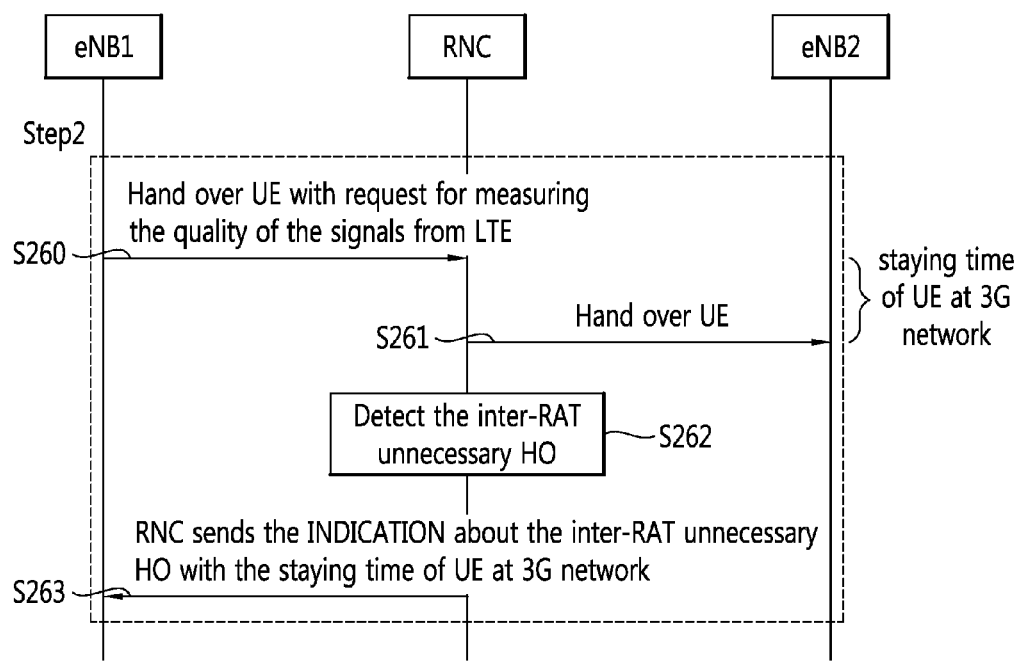
FIG. 14 shows another example of receiving an indication according to an embodiment of the present invention.

FIG. 14 shows another example of receiving an indication according to an embodiment of the present invention.

At step S260, the eNB1 hands over the UE to the RNC with request for measuring quality of signals from LTE. At step S261, the RNC hands over the UE to the eNB2. At step S262, the RNC detects the inter-RAT unnecessary HO. In this case, staying time of the UE at the 3G network is measured.

At step S263, the RNC transmits an indication about the inter-RAT unnecessary HO with the staying time of the UE at the 3G network.

Figure 15:
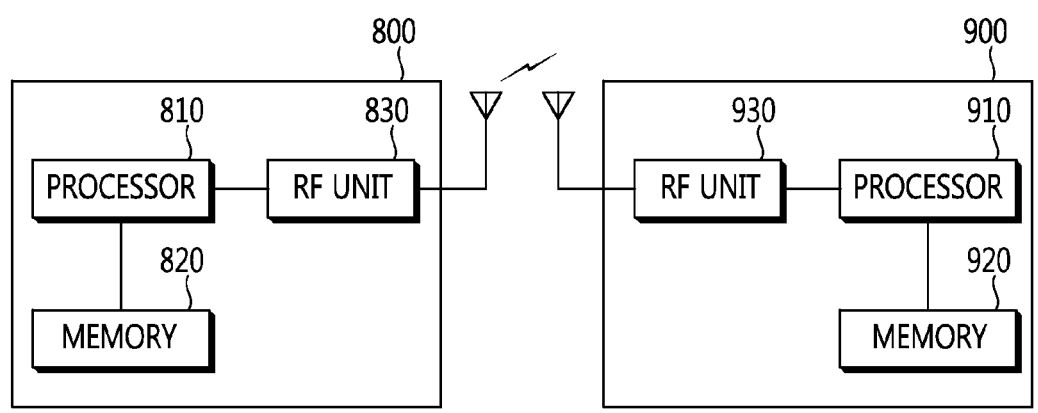
FIG. 15 is a block diagram showing wireless communication system to implement an embodiment of the present invention.

FIG. 15 is a block diagram showing wireless communication system to implement an embodiment of the present invention.

An eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An RNC 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting an indication in a wireless communication system, the method being performed by a first eNodeB (eNB) and comprising:
    receiving, from a second eNB, an inter radio access technology (IRAT) ping-pong detection indication, the IRAT ping-pong detection indication indicating that an IRAT ping-pong is detected by the second eNB, the IRAT ping-pong being a handover of a user equipment (UE) from the first eNB to the second eNB via a radio network controller (RNC);
    transmitting, to the RNC, a request for a handover report message;
    receiving, from the RNC, the handover report message indicating whether or not the IRAT ping-pong is an unnecessary handover in response to the request;
    performing a handover of the UE from the first eNB to the RNC; and
    transmitting, to the second eNB via the RNC, an IRAT necessity indication based on the handover report message,
    wherein the IRAT necessity indication indicates that the handover of the UE from the first eNB to the RNC is a necessary handover when the handover report message indicates that the IRAT ping-pong is not the unnecessary handover.

2. The method of claim 1, wherein the first eNB and the second eNB are based on:
    a 3rd generation partnership project (3GPP) long term evolution (LTE); or
    an evolved universal mobile telecommunications system (UMTS) terrestrial radio access network (E-UTRAN).

3. The method of claim 1, wherein the RNC is based on a universal mobile telecommunications system (UMTS) terrestrial radio access network (UTRAN).

4. The method of claim 1, wherein, if a moving path of the UE is not always present within the coverage of the first eNB and the second eNB, the handover report message indicates that the IRAT ping-pong is not an unnecessary handover.

5. A first eNodeB (eNB), comprising:
    a radio frequency (RF) unit configured to transmit and receive a radio signal; and
    a processor operatively coupled to the RF unit, the processor being configured to:
        receive, from a second eNB, an inter radio access technology (IRAT) ping-pong detection indication, the IRAT ping-pong detection indication indicating that an IRAT ping-pong is detected by the second eNB, the IRAT ping-pong being a handover of a user equipment (UE) from the first eNB to the second eNB via a radio network controller (RNC);
        transmit, to the RNC, a request for a handover report message;
        receive, from the RNC, the handover report message indicating whether or not the IRAT ping-pong is an unnecessary handover in response to the request;
        perform a handover of the UE from the first eNB to the RNC; and transmit, to the second eNB via the RNC, an IRAT necessity indication based on the handover report message, wherein the IRAT necessity indication indicates that the handover of the UE from the first eNB to the RNC is a necessary handover when the handover report message indicates that the IRAT ping-pong is not the unnecessary handover.

6. The first eNB of claim 5, wherein the first eNB and the second eNB are based on:
a 3rd generation partnership project (3GPP) long term evolution (LTE); or
an evolved universal mobile telecommunications system (UMTS) terrestrial radio access network (E-UTRAN).

7. The first eNB of claim 5, wherein the RNC is based on a universal mobile telecommunications system (UMTS) terrestrial radio access network (UTRAN).

8. The first eNB of claim 5, wherein, if a moving path of the UE is not always present within the coverage of the first eNB and the second eNB, the handover report message indicates that the IRAT ping-pong is not an unnecessary handover.

* * * * *